Figure 1:
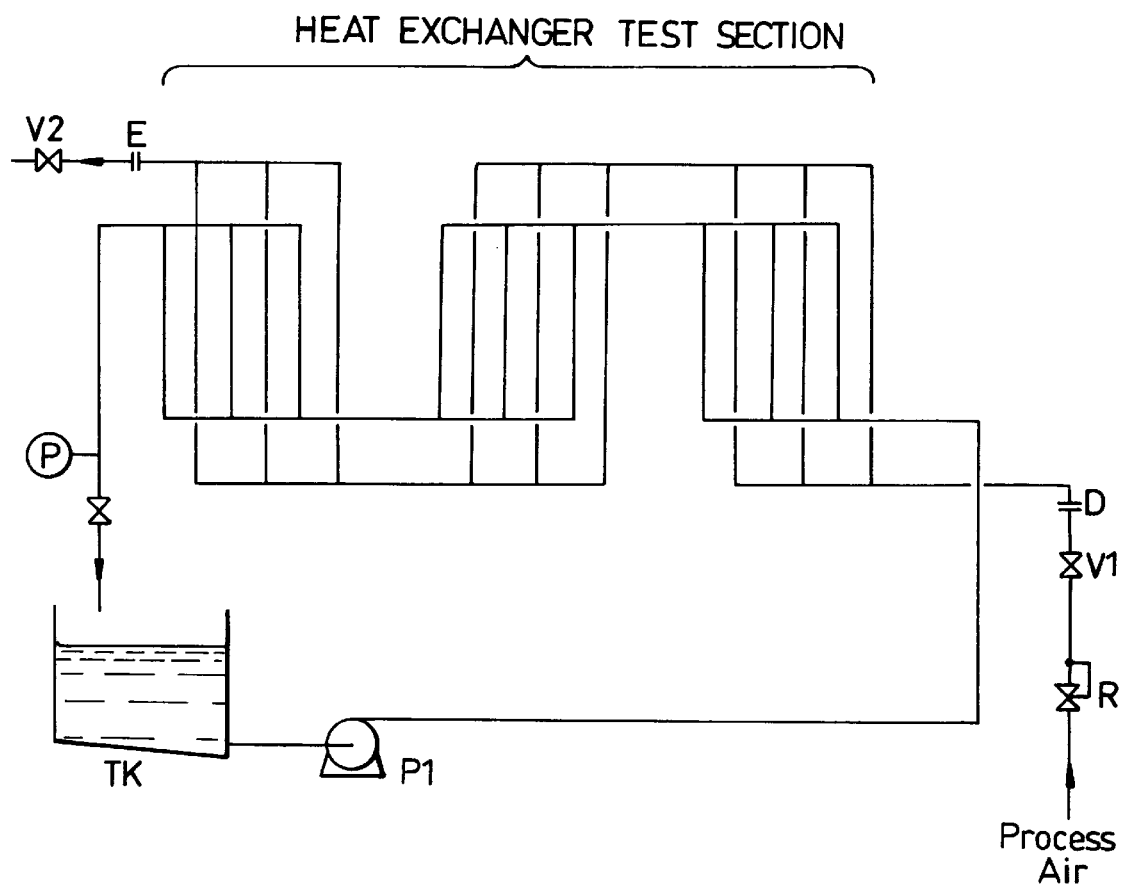

United States Patent [19]

Shaw et al.

[11] Patent Number: 6,009,745
[45] Date of Patent: Jan. 4, 2000

[54] METHOD OF LEAK TESTING AN ASSEMBLED PLATE TYPE HEAT EXCHANGER

[75] Inventors: Jonathan Graham Shaw, Goldboro, N.C.; Stephan Dall, Egtved, Denmark

[73] Assignee: APV Corporation, Goldboro, N.C.

[21] Appl. No.: 08/949,124

[22] Filed: Oct. 10, 1997

[51] Int. Cl.[7] .............................. G01M 3/04; F28F 27/00
[52] U.S. Cl. ........................................... 73/40.7; 165/11.1
[58] Field of Search ........................... 73/40.7; 165/11.1, 165/165, 167, 104.14

[56] References Cited

U.S. PATENT DOCUMENTS

| | | | |
|---|---|---|---|
| 1,915,965 | 6/1933 | Williams | 436/3 |
| 2,096,099 | 10/1937 | Gaugler | 250/302 |
| 4,758,366 | 7/1988 | Parekh | 252/68 |
| 4,976,311 | 12/1990 | Kurzweg | 165/84 |
| 5,170,840 | 12/1992 | Grunwald | 165/11.1 |
| 5,574,213 | 11/1996 | Shanley | 73/40.7 |

*Primary Examiner*—Hezron Williams
*Assistant Examiner*—Jay L. Politzer
*Attorney, Agent, or Firm*—Michael D. Rechtin; Foley & Lardner

[57] ABSTRACT

A method of positively locating the source of leaks in the heat transfer surface area of the plate heat exchanger between separate product and service fluid paths arranged in an intimate heat exchange relationship is disclosed. The method comprises:

circulating a solution through one fluid path of the exchanger, the solution consisting of solvent with appreciable vapor pressure under the chosen test conditions;

providing a gas flow across the other fluid path of the exchange surface by means of forced or natural convection;

applying a positive pressure differential between solution and gas stream; and detecting visually the location of deposited solutes on or around the other fluid path.

14 Claims, 1 Drawing Sheet

METHOD OF LEAK TESTING AN ASSEMBLED PLATE TYPE HEAT EXCHANGER

TECHNICAL FIELD OF THE INVENTION

The invention relates to the leak testing of an assembled plate type heat exchanger. The method used serves to pinpoint accurately the precise source of all cross leaks in the heat transfer surface.

SUMMARY OF THE INVENTION

According to our invention a method of positively locating the source of leaks in the heat transfer surface area of a plate heat exchanger between separate product and service fluid paths arranged in an intimate heat exchange relationship comprises:

- circulating a solution through one fluid path of the exchanger, the solution consisting of a solvent with appreciable vapor pressure under the chosen test conditions;
- providing a gas flow across the other fluid path of the exchange surface by means of forced or natural convection;
- applying a positive pressure differential between solution and gas stream; and
- detecting visually the location of deposited solutes on or around the other fluid path

SPECIFIC DESCRIPTION

The following description and accompanying drawings referred to therein are included by way of non-limiting example to illustrate how the invention may be utilized.

FIG. 1 illustrates a diagrammatic representation of a dairy pasteurizing thermal section undergoing testing in accordance with the method of this invention.

FIG. 1 shows a multipass heat exchange section within a pasteurizer to be leak tested along with a balance tank (TK), pump (P1) and various valves. The method outlined can be applied to any individual heat exchange section within a plate exchanger or to all thermal sections simultaneously if piped appropriately. The term "test section" can thus be interchanged with the term "complete plate heat exchanger" in the following description. Reference is made to the two sides of the heat transfer surface which are designated as product (A) or service (B) and correspond to the two normally separated fluid flow paths. The designation of which path fluid path is A or B is totally arbitrary and therefore interchangeable.

In the special case of a duo-safety type plate heat exchanger the two fluid paths, product (A) and service (B) are separated by a third leakage fluid path (C) between the two sides of the heat transfer surface normally separating side (A) and (B). For the purposes of this leak test described below a duo-safety plate can be examined by considering side (A) and/or side (B) to constitute the single fluid path side (A) and leakage path (C) to be the service side (B).

This test is normally applied to a plate heat exchanger which is already known to have cross leaks in order to locate accurately all defective components.

The test section is first thoroughly cleaned in place using the existing CIP procedures adopted by the end user to normally clean his equipment, it is then flushed with clean water to remove trace wash chemicals.

The next step is to substantially drain the service side (B) of the test section sufficient to permit a gaseous flow through this side. In rare cases this may necessitate the exchanger being opened depending on the plate type and pass arrangement employed. If the test section is actually opened then a quick visual inspection of the plates can be conducted to locate and remove any plates with obvious defects. For a duo-safety type plate side (B) is the leakage path and therefore normally self draining and the forced drainage step can be omitted. For any plate type heat exchanger using elastomeric gaskets, the plate pack pitch and thereby sealing gasket compression can at the discretion of the operator be relaxed to help improve the crack detection in areas of the surface which could harbor a crack otherwise sealed by fully compressed gasket.

After drainage the assembled plate heat exchanger is connected on the service side (B) at point (D) to a process air supply or any other gaseous supply via regulator (R), the other connection point (E) being left open via a valve (V2). The gas used is usually air. The regulator is adjusted to allow a small continuous gas flow rate through this service side (B). Some exchangers may already permit gas circulation across one side of the exchanger by being substantially open by plate design to the surroundings. For example, in the case of a duo-safety-plate, the edge of the leakage path (B) is exposed to natural circulation of ambient air.

The next step is not essential and at the discretion of the tester can be omitted. Its function is only to obtain qualitative information about the magnitude of cross leakage expected and thereby indicate a suitable value for the back pressure to be applied in the next step. A simple pressure test on the gas side (B) is conducted by closing the valve (V2) and adjusting the regulator until the desired gas pressure level is reached, whereupon (V1) is closed. Observation of the pressure with time can then be made using a manual gauge. After observation, side (B) is depressurized and (V1,V2) opened.

The next step is to fill the product side of the system with clean solvent, normally water, or pre-made up solution and circulate this by means of a pump (P1) from a ballast tank (TK) through the product side of the test section and back to the tank so forming a complete circulation loop. In the case of a pasteurizer the existing product side or CIP plant equipment may be effectively utilized for this purpose. The liquid flow rate should be such as to substantially expel all trapped gases held within the product side (A) of the test section but not in excess.

The circulating solvent or solution in the ballast tank may need to be heated above ambient temperature to a test value depending on solvent choice. If the solvent is water, the temperature should be above ambient.

Heating can be accomplished using a "drop in" type electric heater or steam coil if process steam is available. Circulation is continued for several minutes to promote drying of the service side (B) of the test section. Solvent vapor is removed from the side (B) in the gas stream and the surface dried except at any points of cross leakage.

Pump (P1) is now stopped and a suitable solute (e.g. Potassium sulphate or nitrate) added into the ballast tank. If not using a pre-made up solution then enough solute is dissolved to reach the desired test concentration. Pump (P1) is periodically turned on and off to move solution through the test section and help dissolve the solute as required. In addition to the solute a small quantity of fluorescent or highly colored chemical can be added, to aid later in detection under UV or visible light.

In another embodiment of the invention surfactant agents can be added to the solution to increase detection sensitivity of rate of solution cross leakage.

The pump (P1) is then run continually and the desired flow established. Adjustments are then made to the outlet valve (V2) at connection (E) to produce a static back pressure on the hot solution side (A).

The back pressure ensures a positive pressure differential between the solution side (A) and air side over the entire heat exchange surface of the test section. At the leak detection pressure, the solution is forced through any small plate defects within the heat transfer area and into the side (B) of the exchanger carrying dissolved solute as it passes. The hot solution evaporates into the gas stream concentrating and depositing the solute. For conventional heat exchangers the solute is deposited in the immediate proximity to the leakage site but for a duo-safety plate type until the solute will be concentrated around the exposed leakage path edge or plate periphery.

Solvent vapor is removed through the air stream and out at connection (E) or in case of duo-safety plates by natural convection from the plate edge. The deposited solute forms a continually growing surface area from which solvent can evaporate and the underlying lattice structure of the solute acts to locally lower surface tension and help draw solution through the crack. (i.e. promote wicking action.) The rate under which solution is drawn through the defect can increase as the evaporative surface area of the solute deposit increases, thus accelerating the rate of solute formation making the test highly sensitive. Rate of cross leakage once the process is initiated by the test pressure differential becomes fairly insensitive to the magnitude of the differential pressure applied as solute tends to decrease the cross sectional area for flow from the leakage path. This process helps to prevent solute deposits forming away from the actual end of the leakage path so helping to pin point exact locations. In the case of duo-safety plates solute is formed away from the actual site of leakage so in this instance will not accurately pinpoint the site of failure.

Under the test conditions the fluorescent or colored agent is concentrated on the bright solute surface which by virtue of increased contrast makes the presence of the leakage path highly visible. The crystal structure of the solute when covered with a fluorescent agent can serve to concentrate the light emitted making the solute appear to shine more brightly than if only the dye were present alone. The synergistic action of solute and fluorescent agent makes detection of even very small solute deposits possible.

In a modification of the process described above, at one side (A) of the plate heat exchanger a fluid (X) is put on overpressure by circulation over a balance tank to ensure that all air has been removed from the plate heat exchanger. Circulation can be stopped, but static pressure must be held on side (B). At side (B) a fluid (Y) is entered in a similar manner, but it is essential to ensure that side (B) is at a lower pressure than side A.

A small quantity of fluid (X) will be forced into side (B) and a reaction between the two fluids at the location of any crack or cracks will take place. The reaction will remain on the location to ensure easy visual identification after disassembly of the plate heat exchanger.

The processes described above have the advantage that testing of the plates for leakage is achieved without dismantling gaskets prior to testing.

In a traditional method end plate is tested one-by-one and much more time is consumed since each plate is tested individually using penetrant liquids which are difficult and expensive to dispense.

What is claimed is:

1. A method of locating a source of leakage or a crack in a heat transfer surface area of a plate heat exchanger between separate product and service fluid paths arranged in an intimate heat exchange relationship, the method comprises:

circulating a solution through one fluid path of the exchanger, the solution comprised of a solvent and a solute in the solvent which has an appreciable vapor pressure under the chosen test conditions;

providing a gas flow across another fluid path of the exchange surface by means of at least one of forced and natural convection;

applying a positive pressure differential between the solution and the gas flow; and detecting visually a leakage location from solute deposited at the leakage location upon evaporation of the solvent said solute undergoing an increase in amount deposited as the solvent evaporates and forming an increased surface area aiding in further deposition of said solute and the increased amount of said solute also acting to promote a wicking action to draw leaking solution through the crack.

2. A method according to claim 1, in which a duo-safety type plate heat exchanger is tested, two fluid paths product (A) and service (B) being separated by a third leakage fluid path (C) existing between two sides of a heat transfer surface separating sides (A) and (B), a duo-safety plate being examined by considering at least one of the side (A) and the side (B) to constitute the side (A), and the side (B) to be the leakage fluid path (C).

3. A method according to claim 1 in which the heat exchanger is a plate type exchanger, said plate type exchanger being at least one of a fully gasketed and a welded plate pair type construction.

4. A method according to claim 1 in which the heat exchanger is a hell and tube exchanger.

5. A method according to claim 1, in which enhanced detection of cracks is achieved by relaxing the compressed pitch of a gasketed form of said plate heat exchanger.

6. A method according to claim 1, in which enhanced detection of the presence of the solute deposited is made by viewing the solute deposited by use of ultra violet (UV) light.

7. A method according to claim 1, in which the step of detecting visually a rate of solution cross leakage is increased by addition of surfactant agents.

8. A method according to claim 1, in which leak detection sensitivity is increased through use of a step of applying a non steady state differential pressure.

9. A method according to claim 1, in which the gas flow across the non solution side is replaced by a different form of solution compared to that used on a side (A), such that when solution from the side (A) mixes with solution from a side (B) it reacts chemically to form an insoluble product in a solvent used on the side (B) and which is deposited in and around the leakage location.

10. A method of locating a source of leaks or a crack in a heat transfer surface area of a plate type heat exchanger between separate product and service fluid paths arranged in an intimate heat exchange relationship, the method comprising the steps of:

circulating a first fluid through one fluid path side (A) of the exchanger;

circulating a second fluid trough another fluid path side (B) and when the first fluid mixes with the second fluid at a leakage location, a chemical reaction occurs to form an insoluble product in the second fluid with said insoluble product undergoing an increase in amount deposited as the first and second fluid react and forming an increased surface area which assists in further deposition of insoluble product and the increased amount of insoluble product acting to promote a wicking action to draw through the crack the second fluid into contact with the first fluid, said insoluble product depositing around the leakage location; and detecting visually said insoluble product deposited around the leakage location.

11. A method according to claim 10, in which the insoluble product formed is visually obvious when the surface of the plates are inspected in at least one of ambient and UV light conditions.

12. A method according to claim 1, including the step of depositing the solute with a fluorescent component thereby enhancing the visibility of the solute deposited.

13. A method according to claim 1, including the step of adding a colored dye component to the solution.

14. A method according to claim 1 wherein the solvent consists essentially of water.

* * * * *

UNITED STATES PATENT AND TRADEMARK OFFICE
CERTIFICATE OF CORRECTION

PATENT NO. : 6,009,745
DATED : Jan. 4, 2000
INVENTOR(S) : Shaw et al.

It is certified that error appears in the above-identified patent and that said Letters Patent is hereby corrected as shown below:

In col. 4, line 37, Claim 4, "hell" should be changed to - - shell - -.

Signed and Sealed this

Third Day of April, 2001

Attest:

NICHOLAS P. GODICI

Attesting Officer      *Acting Director of the United States Patent and Trademark Office*